March 15, 1960

E. H. HENNIGES 2,928,699

LUBRICATOR PAD FOR AXLE BEARINGS
ESPECIALLY OF RAIL VEHICLES

Filed Sept. 9, 1957

INVENTOR

E. Henniges

By Lowry & Rinehart

ATTYS.

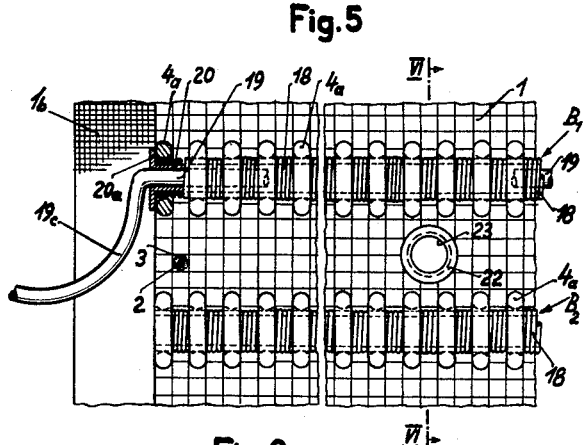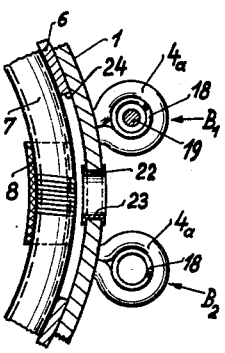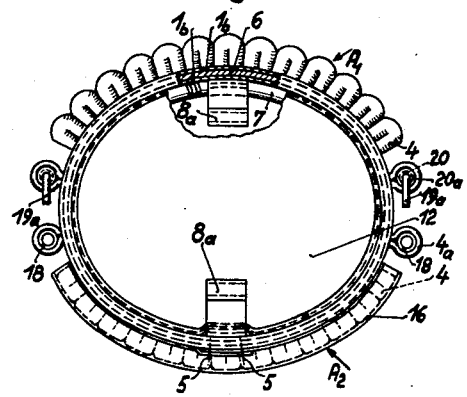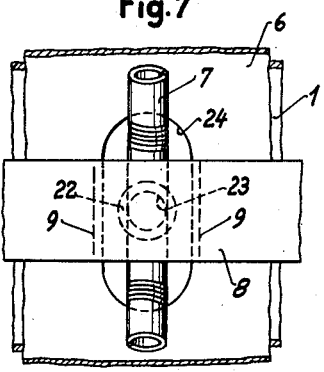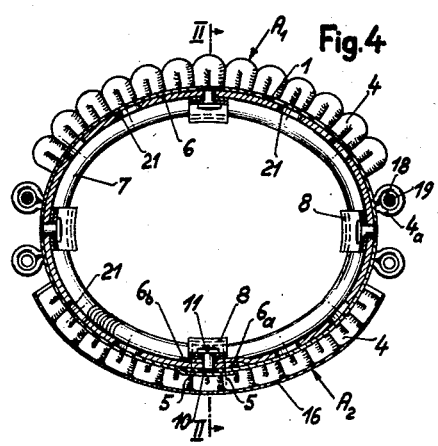

United States Patent Office 2,928,699
Patented Mar. 15, 1960

2,928,699

LUBRICATOR PAD FOR AXLE BEARINGS ESPECIALLY OF RAIL VEHICLES

Ernst Herrmann Henniges, Hannover, Germany, assignor, by mesne assignments, to Etablissement Rugero Company, Vaduz, Liechtenstein Application September 9, 1957, Serial No. 682,963

Claims priority, application Germany September 10, 1956

20 Claims. (Cl. 308—88)

The invention relates to a lubricator pad for axle bearings, especially of rail vehicles, which consists of a flexible tubular outer sleeve of absorbent material and an inner cylindrical hollow body possessing resilient qualities carrying said sleeve and which in compressed state can be slipped in longitudinal direction under the axle neck along the bottom of the axle bearing housing.

An object of the invention is to provide a simple and cheap lubricator pad of great durability which can be produced in series manufacture and, on the one hand, is so soft and elastic that it adapts itself uniformly to the under side of the axle neck at all points, yet, on the other hand, possesses such bending strength that it can be pushed in from the raised accessible aperture of the lubricating bearing housing, past the collar of the axle neck, along the bottom of the axle bearing housing and under the axle neck.

Another object of the invention is to make the elastic deformability of the lubricator pad so that the pad exerts sufficiently strong pressure against the underside of the axle neck, and that this pressure does not weaken under continuous load, and to ensure that the lubricator pad, which is strongly compressed when being slipped into the axle bearing housing and forced past the axle neck collar, resumes its shape after passing the collar and bears at all points uniformly tightly against the under side of the axle neck.

Finally, another aim of the invention is to ensure that the lubricator pad always retains its good absorbent properties and that the feeding of the lubricant to the axle neck is interrupted neither by the soiling or dilution of the oil nor by heat, cold or chemical action.

In the case of the known lubricator pads made from absorbent cellulose sponge material, the pores are exposed to the danger of becoming clogged. The lubricator pads of known construction composed of one or several layers of felt or of an inner layer of stiff fabric and an outer layer of absorbent textile material in the form of a tube are unsatisfactory because the surfaces of the pads do not bear sufficiently firmly against the axle necks and in as far as the lubricating effect is concerned. The last-mentioned form of construction is, moreover, open to the objection that the portion of the outer fabric sleeve bearing against the axle neck wears quickly.

All the above-mentioned objections and disadvantages to which the construction and use of the sleeve-shaped lubricator pads hitherto known were liable, are overcome according to the invention by the provision of a lubricator pad which comprises a tubular outer sleeve of absorbent material, an inner cylindrical hollow body possessing resilient properties carrying said sleeve, said pad being adapted to be slipped in compressed state in longitudinal direction under the axle neck along the bottom of the axle bearing housing, said cylindrical hollow body consisting of a carrier support formed from a sheet of resiliently flexible, non-absorbent, oil-resisting material rolled in the form of a tube and provided with a plurality of perforations, and at least one spirally-wound tubular spring ring contributing to the resilient effect and arranged within said carrier support with its windings extending transversely to the longitudinal central axis of the carrier support and distributed over the entire length thereof, and the tubular outer sleeve consisting of a plush fabric layer with wick-like core threads around which threads of a material possessing great bulging elasticity are spun.

In the case of a lubricator pad constructed in the manner above indicated, the sleeve-shaped rolled sheet which may be of synthetic rubber or the like, combined with the tubular spring rings, impart to the lubricator pad the advantageous property of unimpeded elastic deformability in all directions, such as is necessary for the easy fitting and removal of the lubricator pad and for the uniform adaptation or snug fitting of the upwardly directed surface zone of the pad against the neck of the axle. In addition, the lubricator pad, thanks to the sheet of material rolled to a tube, possesses the resistance to bending in longitudinal direction necessary for slipping through the narrowest portion of the axle bearing housing.

The fabric of the pad sleeve is composed of relatively thick warp threads of known construction in which the core threads acting like wicks possess excellent absorbent properties and the less absorbent threads spun around them, the shortness necessary for stability and wear-resistance. The fabric sleeve bearing directly against the rolled sheet of synthetic rubber sucks up the lubricant in the hollow pad through the holes in the sheet, without the aid of any bundles of absorbent or suction threads, so that the portion of the surface of the fabric sleeve bearing against the under side of the axle neck is always well saturated with lubricating oil and, consequently, a sufficient quantity of lubricant is constantly fed to the axle neck as it rotates. To prevent the oil feed by the warp threads or the core threads from being interrupted at any point, it is proposed according to the invention to arrange a longitudinal seam uniting the plush fabric layer in the form of a closed sleeve, and extending in the longitudinal direction of the upper or lower zenithal line of the lubricator pad which is of circular cross section.

The lubrication can, according to another feature of the invention, be improved by forming in the fabric layer nap loops from the warp threads in such arrangement that, when the fabric sleeve is closed, only the upper and lower surface zones thereof have knubs. The lateral surface zones are left without knubs because these would impede the upward feed of the oil by the warp threads.

To secure the lubricator pad slipped under the axle neck against shifting on the bottom of the axle bearing housing in the transverse and longitudinal directions in relation to the axle neck, it is possible, according to the invention, to provide in each of the two lateral zones of the fabric sleeve which are without knubs, at least one elastic flexible tubular body extending parallel to the longitudinal axis of the pad for receiving a rod having exposed upwardly extending rear sections secured under elastic bending stress in known manner behind a transverse rib of the axle bearing housing and thereby holding the lubriactor pad in position in the axle bearing housing. The rods introduced into the elastic flexible tubular bodies impart to the lubricator pad increased bending strength, with the result that the uniformly firm pressure exerted by the whole of the upwardly directed surface zones of the fabric sleeve against the underside of the axle neck is considerably assisted. The flexible tubular bodies which can be made from elastic oil-resistant synthetic material or—with the object of avoiding damage when the rods are being introduced—still better from metallic tubular springs, contribute to increasing the bending strength of the lubricator pad and in this respect act more favorably when two tubular bodies for receiving the rods are fitted on each side of the fabric sleeve at uniform distances from the horizontal symmetry plane of the pad.

The elastic flexible tubular bodies can be fitted on the lateral surfaces of the fabric sleeve where there are no knubs without special means of fixation and without appreciable extra cost in a simple manner by being woven into the loops on the unpicked lateral surfaces. This also presents the advantage that any rubbing of the tubular bodies, when they are composed of tubular springs, against the axle neck or against the side walls of the axle bearing housing is reliably prevented.

In order to prevent the loop formations on the ascending unpicked side sections of the fabric sleeve from interrupting or interfering with the oil being carried in upward direction, it is advisable to form from only every second or third warp thread of the fabric sleeve a retaining loop for the elastic flexible tubular bodies when it is being woven-in, and to allow the other warp threads to run through smoothly behind the tubular body without forming loops.

One of the nap surface zones of the fabric sleeve is preferably covered, in the process of manufacture of the lubricator pad, by a tear-off protecting foil sewn on to the edges of the fabric layer. This foil serves to protect against wear that nap surface zone of the lubricator pad which comes into contact with the bottom of the axle bearing housing when the pad is inserted therein, so that, when the nap surface zone which is originally directed upwards wears out, the lubricator pad can be withdrawn from the axle bearing housing and, after tearing off the protecting foil and turning the pad through an angle of 180° about its longitudinal axis, reintroduced into the axle bearing housing in turned position with its as yet unused nap surface zone towards the underside of the axle neck. In this manner the life of the lubricator pad is doubled.

In a preferred form of construction the hollow pad is closed at both ends by a bottom piece sewn to the edges of the fabric and the edges of the inner rolled sheet and is maintained by the bottom pieces in the shape of a hollow body of elliptical cross-sectional shape. At the same time the bottom piece on the end of the pad located at the rear during the insertion of the pad is preferably made from an oil-absorbent and oil-permeable but water-repellent filter material and the bottom piece at the opposite end of the pad is covered on its inner side with an oil and water impermeable foil layer which is sewn to the bottom of the fabric edge of the outer fabric sleeve and to the edge of the inner rolled sheet. With the bottom pieces of the pad arranged and constructed in this manner, it is possible to attain that only filtered lubricating oil, undiluted with water always penetrates to the interior of the pad and only perfect oil is fed to the lubricated surface, whereas on the other hand losses of lubricating oil due to splashing over into the dust-ring pocket chamber adjacent the axle bearing space are avoided to a great extent by the bottom piece covered by the liquid-impermeable foil layer.

The tubular spring rings are preferably fixed on the inner surface of the rolled sheet by strips of fabric running in longitudinal direction of the rolled sheet and these strips are in turn secured to the rolled sheet by flat-headed rivets with interengaging male and female parts which are firmly locked in closed position.

Another feature of the invention consists in that, on at least two diametrically opposite points of the pad, preferably at middle points of the upwardly extending unpicked lateral surface zones, holes are provided by fitting eyelets in these zones for allowing the lubricant to run out of the interior of the hollow pad, with which lubricant the pad must be saturated for a time before it is taken into use.

A preferred embodiment of the lubricator pad according to the invention is illustrated by way of example in the accompanying drawings, in which:

Fig. 3 is an end view of the lubricator pad looking at the partly broken away bottom piece located at the rear when the pad is being slipped into position;

Fig. 4 is a vertical cross section taken on line IV—IV of Fig. 2;

Fig. 5 shows on a larger scale a section of the pad in side elevation;

Fig. 6 is a vertical cross section taken on line VI—VI of Fig. 5, and

Fig. 7 is an internal view of the middle section of the pad.

Figure 1:
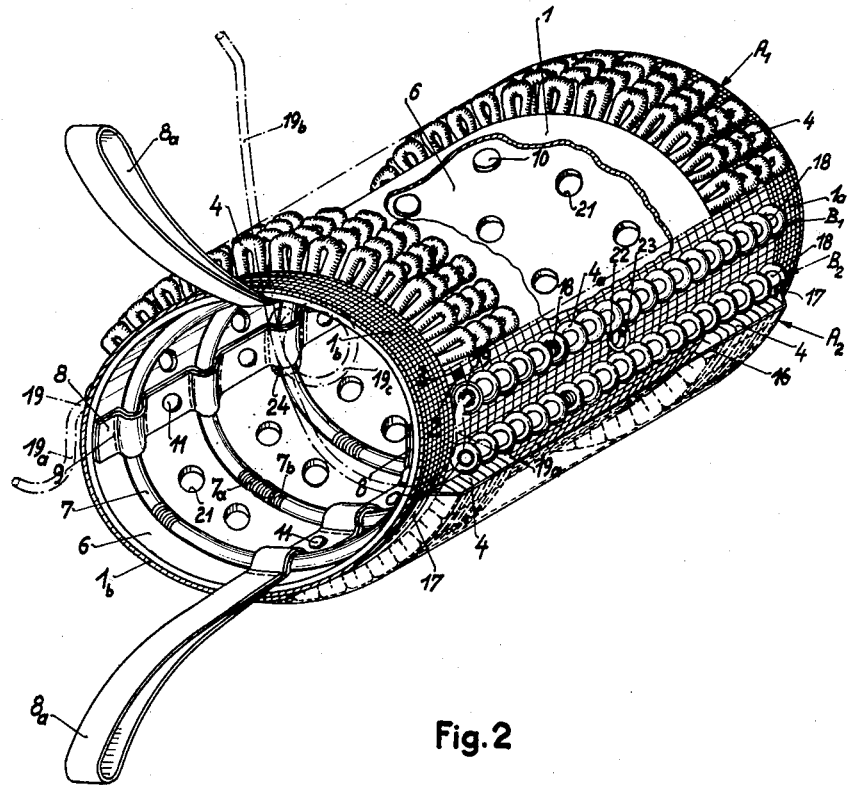
Fig. 1 is a perspective view of a lubricator pad without rear closing bottom piece, parts being broken away.

For making a lubricator pad according to the invention a fabric is employed in which a base fabric 1 is composed of relatively weak warp and weft threads with particularly strong warp threads 2 and 3 worked in the middle portion up to its two edge zones 1a and 1b. Each of these strong warp threads consists of a very absorbent, wick-like cotton core 2 whipped around with woolen threads 3. During the weaving of the fabric, nap loops 4 are picked out of the warp threads 2 and 3 in such a manner that two opposite surface zones A1, A2 of the fabric rolled to a closed fabric sleeve have knubs.

On the two unpicked surface zones in the example illustrated, loops 4a are formed from every second warp thread so that on each of these two lateral zones two rows of loops B1, B2 are formed. Before shooting the weft thread, an elastic flexible tubular body 18, such as a tubular spring, is inserted in each of these rows of loops B1, B2 so that, when the fabric is finished, four flexible tubular bodies 18 are firmly woven therein. The transverse edges of the fabric are sewn together by connecting seams 5 which extend centrally through a picked or looped zone A2 of the fabric sleeve directed downwards in Figs. 1 to 3.

In a finished lubricator pad, the rows of loops B1, B2 with the tubular bodies 18 woven therein, extend parallel to the longitudinal axis of the pad and are located on the two sides of and at a uniform distance from the horizontal symmetry plane of the pad. The tubular bodies 18, surrounded and held in position by the loops 4a of the rows of loops B1, B2, form passages for the insertion of rods 19. The rods 19 are made for example of resilient steel wire and have rear sections which project from the tubular bodies 18 and are first bent a short distance in downward direction at 19a and then again bent upwards at 19b. Said rods 19 can be provided with a turn or twist 19c in the middle of the section 19b. The free ends of the wire rod section 19b are held behind a transverse rib projecting from the top of the axle bearing housing, thereby subjecting the free sections 19a, 19b and possibly also 19c to bending stress, in the manner known for securing axle lubricating devices, provided with resilient supporting points against radial and axial displacement on the bottom of the axle bearing housing.

Instead of providing two tubular bodies 18 on each side of the lubricator pad, a single body 18 may be arranged on each side of the pad, when in this case these tubular bodies are preferably mounted exactly in the horizontal symmetry plane of the lubricator pad. However, the arrangement of two tubular bodies 18 on each side of the lubricator pad is advantageous in as far as four such bodies 18, which may be made from elastic flexible synthetic material instead from tubular springs, impart to the finished lubricator pad a still greater bending strength than only two such tubular bodies 18.

For facilitating the insertion of the wire rods 19 into the tubular bodies 18 after the lubricator pad has been pushed under the axle neck, slightly conical sleeves or bushes 20 are pressed or otherwise fixed in the insertion apertures of the tubular bodies 18. Outwardly beaded-over edge sections 20a of the sleeves or bushes 20 bear against the neighboring loops 4a and reliably prevent the tubular bodies 18 from becoming displaced in the rows of loops B1, B2, when the wire rods 19 encounter resistance on being pushed into the tubular bodies, owing to the fact that they are introduced into the bodies in a position inclined to that of said bodies.

Figure 2:
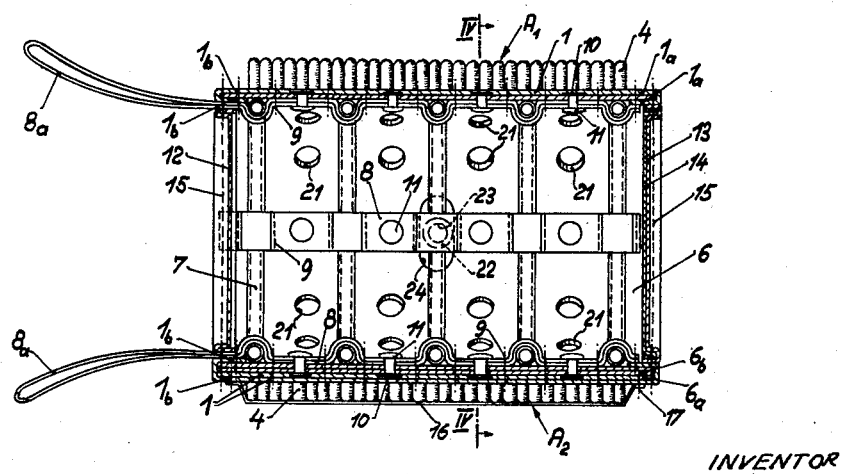
Fig. 2 is a vertical longitudinal section taken on line II—II of Fig. 4.

A sheet 6 of resilient pliable, oil-resisting and non-absorbent material, such as synthetic rubber, rolled in the form of a tube, is inserted in the fabric sleeve. The sheet 6, which in spread condition is of elongated rectangular shape, is so dimensioned that in rolled state, when forming a roll with overlapping longitudinal edge portions 6a, 6b, it just fits in the fabric sleeve and the outer wall surface of the roll bears snugly against the inner surface of the fabric sleeve. The projecting edge zones 1a, 1b of the base fabric of the fabric sleeve are folded over the edges of the roll into the interior thereof as shown in Fig. 2. The sheet 6 is provided with a large number of circular holes 21.

A plurality, for example five tubular springs 7, bent in closed annular shape, are fixed on the inner wall surface of the roll. Each tubular spring, the windings of which bear one against the other without any gaps, is formed into a spring ring in that one end 7a of the spring is slightly tapered and inserted in the other end 7b of the spring and then the windings of the two spring ends are screwed together by turning in opposite directions.

For fixing said tubular spring rings on the inner wall surface of the roll formed by the sheet 6, several doubled fabric strips 8 extending in longitudinal direction of the roll are arranged at regular intervals apart, for example 90°, and sewn together on the two sides of each tubular spring ring 7 by seams 9. The fabric strips 8 are fixed on the rolled sheet 6 by means of two-piece flat-headed rivets 10, 11 each of which has a male part and a female part which latter firmly locks with the male part on being pressed therein. The rivets 10, 11 are arranged between the individual tubular spring rings 7 and the flat heads of the outer rivet parts are located between the rolled sheet 6 and the fabric sleeve.

The overlapping edge portions 6a, 6b of the sheet 6 are at the same time firmly united by one of the longitudinal rows of rivets 10, 11.

Two fabric strips 8 located at diametrically opposite points of the rolled sheet 6 are extended beyond said rolled sheet and folded back therein. Sections 8a of the fabric strips 8 project from the pad and form holding loops for conveniently pulling the lubricator pad out of the axle bearing housing.

The two ends of the above-described hollow pad are closed by closing bottom pieces 12 and 13 of elliptical shape. The closing bottom piece 12 on the end of the pad provided with holding loops and which is remote from the housing of the axle bearing when the lubricator pad is being inserted, is made from filter material which is oil-absorbent and permeable to oil but does not allow the passage of water. A foil layer 14 which is permeable to oil and water is fitted on the innerside against the closing bottom piece 13, which consists of cloth, at the other end of the pad. Both bottom pieces 12 and 13 are attached at their edges by sewing, see seam 15 in Fig. 2, to the inwardly bent edges 1a and 1b, respectively, of the base fabric 1 of the fabric sleeve and to the edges of the rolled sheet 6 covered by the seams of the fabric edges 1a and 1b, respectively. The foil layer 14 is at the same time fixed on the fabric sleeve with the bottom piece 13 by the seam 15. The lubricator pad is given a flat elliptical cross-sectional shape by the elliptical cover bottom pieces 12 and 13. The napped surface areas A1, A2 of the fabric sleeve lie symmetrically on the two sides of the short cross section axis of the elliptical hollow pad.

A tear-off protecting foil 16 is stretched over the nap surface zone A2 of the fabric sleeve and covers all the nap loops 4 of this zone A2 and hold these nap loops slightly compressed. The foil 16 is sewn to the outer edge sections or zones 1a, 1b of the base fabric by stitches 17 and serves to protect the nap loops 4 which it covers, against wear when the lubricator pad is slipped under the axle neck along the bottom of the axle bearing housing with the exposed nap surface zone A1 facing upwards. When the nap loops 4 of the upper nap surface zone A1 have worn out after being in use for a relatively long time, the lubricator pad is pulled out of the axle bearing housing and, after the protecting foil 16 has been torn off, is again inserted in the axle bearing housing in a position turned through an angle of 180° about its longitudinal axis. The unused nap loops 4 of the nap surface zone A2 which are now directed upwards then allow the lubricator pad to be used for another full period of life. A metal eyelet 22 is fixed in the middle of each of the two unpicked lateral surface zones, in the example illustrated in the free space between the rows of loops B1 and B2 surrounding the elastic flexible tubular bodies 18 for the wire rods 19, and forms an aperture 23. An elongated slot 24 is cut in the section of the sheet 6 behind this eyelet 22. This slot 24 is, as can be seen from Fig. 2, so dimensioned that its width is greater than the diameter of the spirally wound tubular spring ring 7 mounted in front thereof on the inner surface of the sheet 6 and representing the middle tubular spring ring of the pad. On the other hand the length of the elongated slot 24 is greater than the width of the fabric strip 8 extending at half the height of the pad along the inner side of the rolled synthetic rubber sheet 6. Consequently, there is a direct communication between the inner space of the lubricator pad and the apertures 23 bordered by the metal eyelets 22, through the intermediary of the slot 24 in the synthetic rubber sheet 6.

Said apertures 23 serve as discharge holes for the lubricating oil with which the lubricator pad must be thoroughly saturated before it is taken into use. To enable the saturation oil to flow out of the interior of the pad, the lubricator pad is suspended so that one of the two apertures 23 located diametrically opposite each other on the two side surfaces of the pad, is directed upwards and the other downwards.

It is evident that it is also possible to provide instead of a single aperture 23, two or more discharge apertures in symmetrical arrangement to the vertical cross-sectional central plane of the lubricator pad. The provision of two discharge apertures on each side of the lubricator pad comes particularly into consideration for the construction of a lubricator pad in which there is only a single row of loops with an elastic tubular body woven therein on each side. In this case the two discharge apertures 23 can be advantageously arranged one on each side of this row of loops in the transverse central plane of the pad.

The lubricator pad is elastically deformable in all directions on account of the soft elasticity attained with the rolled sheet 6 and the tubular spring rings 7 and can be slipped in past the axle neck collar along the bottom of the axle bearing housing without any difficulty whatever and again removed from the axle bearing housing just as simply. The lubricator pad, after being slipped-in in compressed state, again assumes its original form when in fitted position and adapts itself snugly to the under side of the axle neck with one of the nap surface zones A1, A2 of the fabric sleeve.

By the insertion of the wire rods 19 into the elastically flexible tubular bodies 18 the lubricator pad is given a certain bending stiffness which ensures that the upwardly directed nap surface zone A1 or A2 bears uniformly firmly at all points against the under side of the axle neck. At the same time the ascending rear sections 19b of the wire rods engaging under bending stress behind a cross rib of the axle bearing housing, ensure that the lubricator pad is secured in the proper position in the axle bearing housing.

From the above detailed description of the invention, it is believed that the construction will at once be apparent, and while there is herein shown and described a preferred embodiment of the invention, it is nevertheless to be understood that minor changes may be made therein without departing from the spirit and scope of the invention as claimed.

I claim:

1. A lubricator pad for axle bearings of rail vehicles in particular, comprising a tubular outer sleeve of absorbent material, an inner tubular hollow body possessing resilient properties carrying said sleeve, said pad being adapted to be slipped in compressed state in longitudinal direction under the axle neck along the bottom of the axle bearing housing, said tubular hollow body comprising a carrier support formed from a sheet of resiliently flexible, non-absorbent, oil-resisting material rolled in the form of a tube and provided with a plurality of perforations, the inner surface of said tubular, resilient hollow body including longitudinally thereof spring means stiffening said body along its length, said spring means comprising helical convolutions extending about the inner periphery of said support body, and the tubular outer sleeve comprising a plush fabric layer with wick-like core threads having a nap surface of a material possessing great bulging elasticity.

2. A lubricator pad as set forth in claim 1, wherein said spring means includes a plurality of spirally-wound tubular springs distributed at uniform distances apart along the length of the rolled sheet and each of said springs being formed into an endless tubular spring ring by uniting the ends of adjacent springs.

3. A lubricator pad as set forth in claim 1, wherein said spring means includes a plurality of spirally-wound tubular springs distributed at uniform distances apart along the length of the rolled sheet and each of said springs being formed into an endless tubular spring ring by screwing the ends of adjacent springs into the other.

4. A lubricator pad as set forth in claim 1, wherein the plush fabric layer is formed into a closed sleeve by longitudinal seams extending along the upper and lower zenithal lines of the sleeve formed by said plush fabric layer.

5. A lubricator pad as set forth in claim 1, wherein the nap surface is formed of loops from warp threads of the fabric layer and so arranged that knubs are formed on the upper and loyer surface zones of the tubular outer sleeve.

6. A lubricator pad as set forth in claim 1, wherein the nap surface is formed of loops from warp threads of the fabric layer in the upper and lower zones of the tubular outer sleeve, and on each unpicked lateral surface zone thereof at least one flexible tubular body is arranged extending parallel to the longitudinal central axis of the pad and adapted to accommodate a wire rod having an upwardly extending exposed rear section engaging under bending stress behind a transverse rib of the axle bearing housing to secure the lubricator pad in position.

7. A lubricator pad as set forth in claim 1, wherein the nap surface is formed of loops from warp threads of the fabric layer in the upper and lower zones of the tubular outer sleeve, and on each unpicked lateral surface zone thereof two flexible tubular bodies are arranged which extend parallel to the longitudinal central axis and at uniform distances from the horizontal symmetry plane of the pad and are each adapted to accommodate a wire rod having an upwardly extending exposed rear section engaging under bending stress behind a transverse rib of the axle bearing housing to secure the lubricator pad in position.

8. A lubricator pad as set forth in claim 6, wherein the flexible tubular bodies provided on each side of the tubular outer sleeve consist of elastically pliable springs worked into loops formed from the unpicked lateral surface zones of the tubular outer sleeve.

9. A lubricator pad as set forth in claim 6, wherein the flexible tubular bodies provided on each side of the tubular outer sleeve consist of elastically pliable springs worked into loops formed from warp threads of the unpicked lateral surface zones of the tubular outer sleeve.

10. A lubricator pad as set forth in claim 6, wherein a conical bush is provided at one end of the flexible tubular body for facilitating the insertion of the wire rod.

11. A lubricator pad as set forth in claim 1, wherein the plush fabric layer is formed into the closed sleeve by a longitudinal seam and provided at two diametrically opposite points with looped surface zones, the loops in one of said zones being covered by tear-off protecting foil sewn to the edges of the fabric layer and protecting the loops against wear when the pad is inserted in the axle bearing housing with said protected loops directed towards the bottom thereof, so that when the other looped surface is worn, the pad can be used a second time, for which purpose it is withdrawn from the housing turned through 180° about its longitudinal axis and, after removal of the foil, reinserted into the axle bearing housing with the unused nap surface zone directed upwards.

12. A lubricator pad as set forth in claim 1, wherein the lubricator pad is closed at each end by a bottom piece sewn to the edges of the fabric and the edges of the inner sheet and is held together in elliptical cross-sectional shape by these bottom pieces.

13. A lubricator pad as set forth in claim 1, wherein the lubricator pad is closed at each end by a bottom piece, the bottom piece at the rear end of the pad in the direction in which it is introduced into the axle bearing housing being composed of oil-absorbent and oil-permeable yet water-repellent filter material.

14. A lubricator pad as set forth in claim 1, wherein the lubricator pad is closed at each end by a bottom piece, the bottom piece at the front end of the pad in the direction in which it is inserted into the axle bearing housing being covered on its inner side with a foil layer impermeable to oil and water, said foil layer being sewn to the edges of the fabric of the outer sleeve and the edges of the inner sheet.

15. A lubricator pad as set forth in claim 1, wherein the spring means includes spirally-wound tubular springs secured to the inner surface of the rolled sheet by double layer fabric strips which extend in longitudinal direction of the rolled sheet and in turn are fixed to the rolled sheet by flat headed rivets with interengaging male and female parts which permanently lock in closed position, the heads of one part of the rivets being located between the rolled sheet and the outer fabric.

16. A lubricator pad as set forth in claim 1, wherein the lubricator pad is closed at each end by a bottom piece sewn on to the edges of the fabric and the edges of the inner sheet and held together in elliptical cross-sectional shape by these bottom pieces, and wherein the bottom piece at the rear end of the pad in the direction in which it is inserted into the axle bearing housing is provided at two diametrically points with fabric strips extending in longitudinal direction beyond the bottom piece and folded back to form handle loops for removing the lubricator pad from the axle bearing housing.

17. A lubricator pad as set forth in claim 1, wherein at least two diametrically opposite points of the pad eyelets are fixed having holes communicating with the interior of the hollow pad for the escapement of the lubricant with which the pad is saturated before being taken into use.

18. A lubricator pad as set forth in claim 1, wherein at least one flexible tube is arranged extending in longitudinal direction along each side of the fabric sleeve, a flexible rod is inserted in each of said tubes and projects therefrom and engages under bending stress behind a rib in the axle bearing housing thereby holding the pad in position, and eyelets are fixed near the middle of the unpicked lateral zones of the sleeve on each side of the flexible tube and are provided with holes communicating with the interior of the hollow pad for allowing the discharge of the lubricant with which the pad is saturated before being taken into use.

19. A lubricator pad as set forth in claim 1, wherein two flexible tubes are arranged extending in longitudinal direction along each side of the fabric sleeve, a flexible rod is inserted in each of said tubes and projects therefrom and engages under bending stress behind a rib in the axle bearing housing, thereby holding the pad in position, and eyelets are fixed near the middle of the unpicked lateral zones of the sleeve between the two flexible tubes, said eyelets having a hole communicating with the interior of the hollow pad to allow the escapement of the oil with which the pad is saturated before being taken into use.

20. A lubricator pad as set forth in claim 1, wherein the sheet consists of synthetic rubber.

References Cited in the file of this patent

UNITED STATES PATENTS

| 538,553 | Sichelschmidt | Apr. 30, 1895 |
| 2,762,665 | Harkenrider | Sept. 11, 1956 |

FOREIGN PATENTS

| 654,759 | France | Dec. 7, 1928 |